(12) United States Patent
Wilhide et al.

(10) Patent No.: US 10,868,475 B2
(45) Date of Patent: Dec. 15, 2020

(54) DUAL ACTIVE BRIDGE ENERGY STORAGE MODULE SYSTEMS

(71) Applicant: Hamilton Sundstrand Corporation, Charlotte, NC (US)

(72) Inventors: Matthew L. Wilhide, Cherry Valley, IL (US); Frank Z. Feng, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/277,677

(22) Filed: Feb. 15, 2019

(65) Prior Publication Data
US 2020/0266728 A1 Aug. 20, 2020

(51) Int. Cl.
*H02M 7/5387* (2007.01)
*H02M 1/32* (2007.01)
*H02J 7/00* (2006.01)
*H02M 1/08* (2006.01)

(52) U.S. Cl.
CPC ......... *H02M 7/5387* (2013.01); *H02J 7/0068* (2013.01); *H02M 1/08* (2013.01); *H02M 1/32* (2013.01)

(58) Field of Classification Search
CPC ........ H02M 7/5387; H02M 1/32; H02M 1/08; H02J 7/0068
See application file for complete search history.

(56) References Cited

U.S. PATENT DOCUMENTS

| 8,829,723 B2 | 9/2014 | Graovac et al. |
| 8,970,161 B1 | 3/2015 | Cuadros |
| 9,893,633 B1 * | 2/2018 | Li ..................... H02M 3/33546 |
| 2017/0349053 A1 | 12/2017 | Landseadel |

FOREIGN PATENT DOCUMENTS

WO  WO-2018046231 A1  3/2018

OTHER PUBLICATIONS

Yu Fang, Songyin Cao, Yong Xie and P. Wheeler, "Study on bidirectional-charger for electric vehicle applied to power dispatching in smart grid," 2016 IEEE 8th International Power Electronics and Motion Control Conference (IPEMC-ECCE Asia), Hefei, 2016, pp. 2709-2713. (Year: 2016).*
Niyitegeka, Gedeon, et al. "Phase Shift Modulation and DC-Link's Voltage Balancing Control for a DAB DC-DC Converter." 2018 International Conference on Smart Grid (icSmartGrid). IEEE, 2018. (Year: 2018).*

(Continued)

*Primary Examiner* — Daniel J Cavallari
(74) *Attorney, Agent, or Firm* — Locke Lord LLP; Scott D. Wofsy; Alicia J. Carroll

(57) ABSTRACT

An energy storage module (ESM) assembly includes an ESM having an energy source and a multi-level dual active bridge (ML-DAB). The ML-DAB is connected to the energy source to source current therefrom, or send current thereto, or both. A system architecture includes the ESM assembly having an ESM with an energy source, and a ML-DAB connected to the energy source to source current therefrom, or send current thereto, or both. The system architecture includes a DC bus connected to the ESM assembly.

12 Claims, 3 Drawing Sheets

(56) References Cited

OTHER PUBLICATIONS

"Dual Active Bridge Converter." Plexim, www.plexim.com/support/application-examples/1506. (Year: 2020).*
Higa, H., Takuma, S., Kusaka, K., & Itoh, J. I. (2019). Development of T-type Dual Active Bridge DC-DC Converter with Switching Operation Mode Over Wide-Voltage-Operation Range. IJTIA, 139(4), 388-400. (Year: 2019).*
M. A. Moonem and H. Krishnaswami, "Analysis and control of multi-level dual active bridge DC-DC converter," 2012 IEEE Energy Conversion Congress and Exposition (ECCE), Raleigh, NC, 2012, pp. 1556-1561, doi: 10.1109/ECCE.2012.6342628. (Year: 2012).*
U.S. Appl. No. 16/166,535, filed Oct. 22, 2018.
Burkart, R. M., et al. "Comparative $\eta$-$\rho$-$\sigma$ Pareto Optimazation of Si and SiC Multilevel Dual-Active-Bridge Topologies With Wide Input Voltage Range", IEEE Transaction on Power Electronics, vol. 32, No. 7, Jul. 1, 2017, pp. 5258-5270.
Sfakianakis, G. E., et al., "Charge-based ZVS Modulation of a 3-5 Level Bidirectional Dual Active Bridge DC-DC Converter", 2016 IEE Energy Conversion Congress and Exposition (ECCE), Sep. 1, 2016, pp. 1-10.
Extended European Search Report dated Feb. 25, 2020, issued during the prosecution of European Patent Application No. EP 19210711.8.

* cited by examiner

DUAL ACTIVE BRIDGE ENERGY STORAGE MODULE SYSTEMS

BACKGROUND OF THE INVENTION

1. Field of the Invention

The present disclosure relates to electrical systems, and more particularly to electrical systems employing an energy storage module with dual active bridge.

2. Description of Related Art

Vehicles such as aircraft commonly include electrical systems with on-board generator that converts rotational movement within the engines to electrical power. This power is then provided to the electrical loads on the aircraft. During normal operation, the electrical systems on a vehicle can be required to support a variety of electrical transients. These transients may have relatively high slew rates that can significantly impact the power quality of the electrical bus or the performance of the engine providing power to the electrical system.

To compensate for these high slew rate loads, energy storage modules are used to smooth voltage changes from loads connecting and disconnecting from the system. These energy storage modules (ESM) generally include a stack of low voltage energy sources, i.e., energy cells, with a voltage lower than the bus to which the energy cells provide power. Depending on the type of energy cells used in the ESM the ESM can occupy a large volume and have a considerable weight. Multiple cells also require, at times, complex interface systems.

Such conventional methods and systems have generally been considered satisfactory for their intended purpose. However, there is still a need in the art for improved energy storage modules, electrical systems, and methods of controlling voltage on direct current buses with a smaller size, reduced weight and reduced complexity. The present disclosure provides a solution for this need.

SUMMARY

An energy storage module (ESM) assembly includes an ESM having an energy source and a multi-level dual active bridge (ML-DAB). The ML-DAB is connected to the energy source to source current therefrom, or send current thereto, or both.

In some embodiments, the ML-DAB includes a bi-directional DC/AC converter. The DC/AC converter can include a conductor connected to the energy source. The ML-DAB can include a bi-directional isolation transformer connected to the bi-directional DC/AC converter. The ML-DAB can include a second bi-directional DC/AC converter connected to the isolation transformer. The second bi-directional DC/AC converter can be a t-type dual active bridge.

The ESM assembly can be configured and adapted to be electrically coupled to a negative rail, a positive rail and a neutral rail of a DC bus. In some embodiments, the assembly includes a power filter connected to the ML-DAB. The power filter can include a negative lead, a positive lead and neutral filter lead extending therefrom configured and adapted to be electrically coupled to a negative rail, a positive rail and a neutral rail, respectively, of a DC bus. The energy source includes at least one of a fuel cell, battery, or ultracapacitor.

In accordance with another aspect, a system architecture includes the ESM assembly described above. The system architecture includes a DC bus connected to the ESM assembly.

In some embodiments, the ESM assembly includes a power filter coupled between the ML-DAB and the DC bus. The power filter can include a negative lead, a positive lead and neutral filter lead extending therefrom electrically coupled to a negative rail, a positive rail and a neutral rail, respectively, of the DC bus. The ML-DAB in the system architecture can include elements similar to those described above. The ESM in the system architecture can include elements similar to those described above.

The ESM assembly can be electrically coupled to a negative rail, a positive rail and a neutral rail of the DC bus. The ESM assembly can be a first ESM assembly, the system further comprising a second ESM assembly in parallel with the first ESM assembly. The second ESM assembly can be electrically coupled to a negative rail, a positive rail and a neutral rail of the DC bus.

These and other features of the systems and methods of the subject disclosure will become more readily apparent to those skilled in the art from the following detailed description of the embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE EMBODIMENTS

Figure 1:
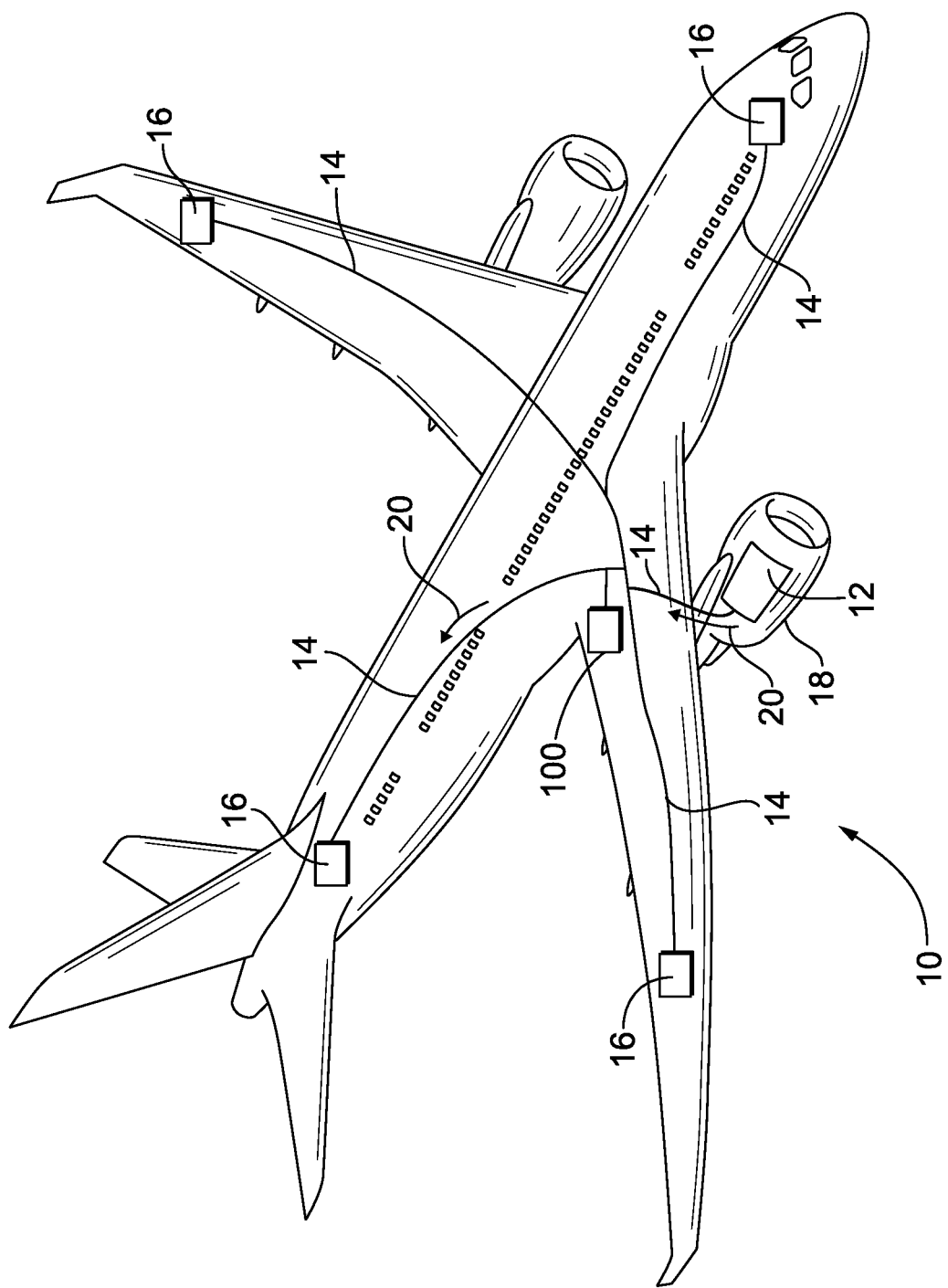
FIG. 1 is a schematic view of an exemplary embodiment of an energy storage module (ESM) assembly constructed in accordance with the present disclosure, showing the ESM assembly having an ML-DAB connected in an aircraft electrical system.

Reference will now be made to the drawings wherein like reference numerals identify similar structural features or aspects of the subject disclosure. For purposes of explanation and illustration, and not limitation, a partial view of an exemplary embodiment of an ESM assembly constructed in accordance with the disclosure is shown in FIG. 1 and is designated generally by reference character 100. Other embodiments of ESM assembly 100 in accordance with the disclosure, or aspects thereof, are provided in FIGS. 2-3, as will be described. The systems and methods described herein can be used in air vehicles, though the present disclosure is not limited to aircraft, e.g. fixed wing aircraft. It is also contemplated that the systems and methods described herein can be used in ground vehicles, e.g. ground vehicles having a high-voltage bus, such as +/−300V.

Referring to FIG. 1, an electrical system 10, e.g., an aircraft electrical system is shown. Electrical system 10 includes a generator 12, a power bus 14, and electrical loads 16. Generator 12 is operably associated with an engine 18, e.g., an aircraft main engine or auxiliary power unit, and is arranged to provide a flow of electrical power 20 to power bus 14. Power bus 14 is connected to respective power-consuming devices 16 to provide electrical power 20 to electrical loads 16. ESM assembly 100 is disposed in electrical communication with power bus 14 and is configured to and adapted to be charged by and discharged from power bus 14. Although an aircraft electrical system is shown and described herein it is to be understood and appreciated that other types of electrical systems can also benefit from the present disclosure.

Figure 2:
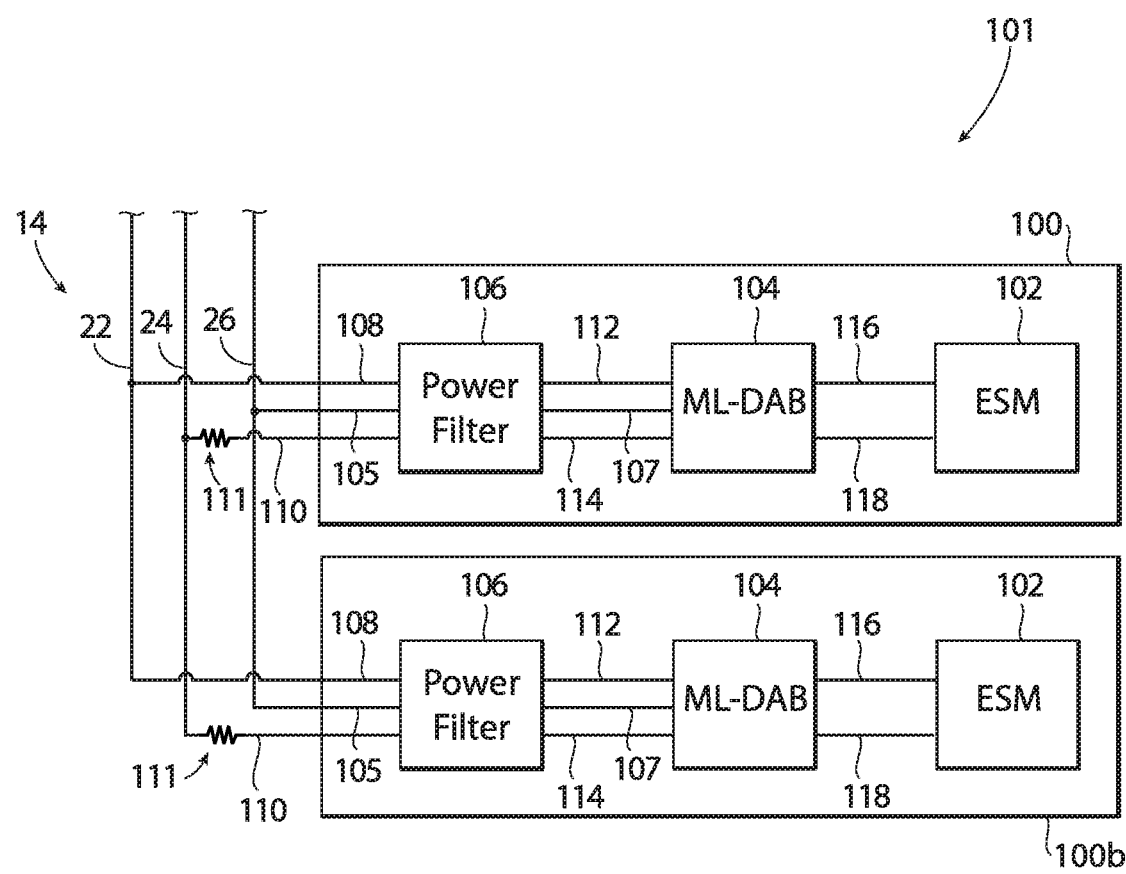
FIG. 2 is a schematic view of the ESM assembly of FIG. 1, showing the ESM assembly connected to the DC bus along with another ESM assembly in parallel.

With reference now to FIGS. 1 and 2, a system architecture 101 includes ESM assembly 100 and power bus 14. As shown and described herein, power bus 14 is a DC power bus and includes a positive rail 22, a neutral rail 24, and a negative rail 26. Positive rail 22, neutral rail 24, and negative rail 26 connect one or more of electrical loads 16 with generator 12 to provide DC power 20. It is contemplated that DC power bus 14 is a high voltage DC power bus, e.g., +/−270 volts or higher (e.g., +/−300 volts for ground vehicles), with the positive voltage provided on positive rail 22, the negative voltage provided on negative rail 26, and neutral rail 24 being 0 volts.

Figure 3:
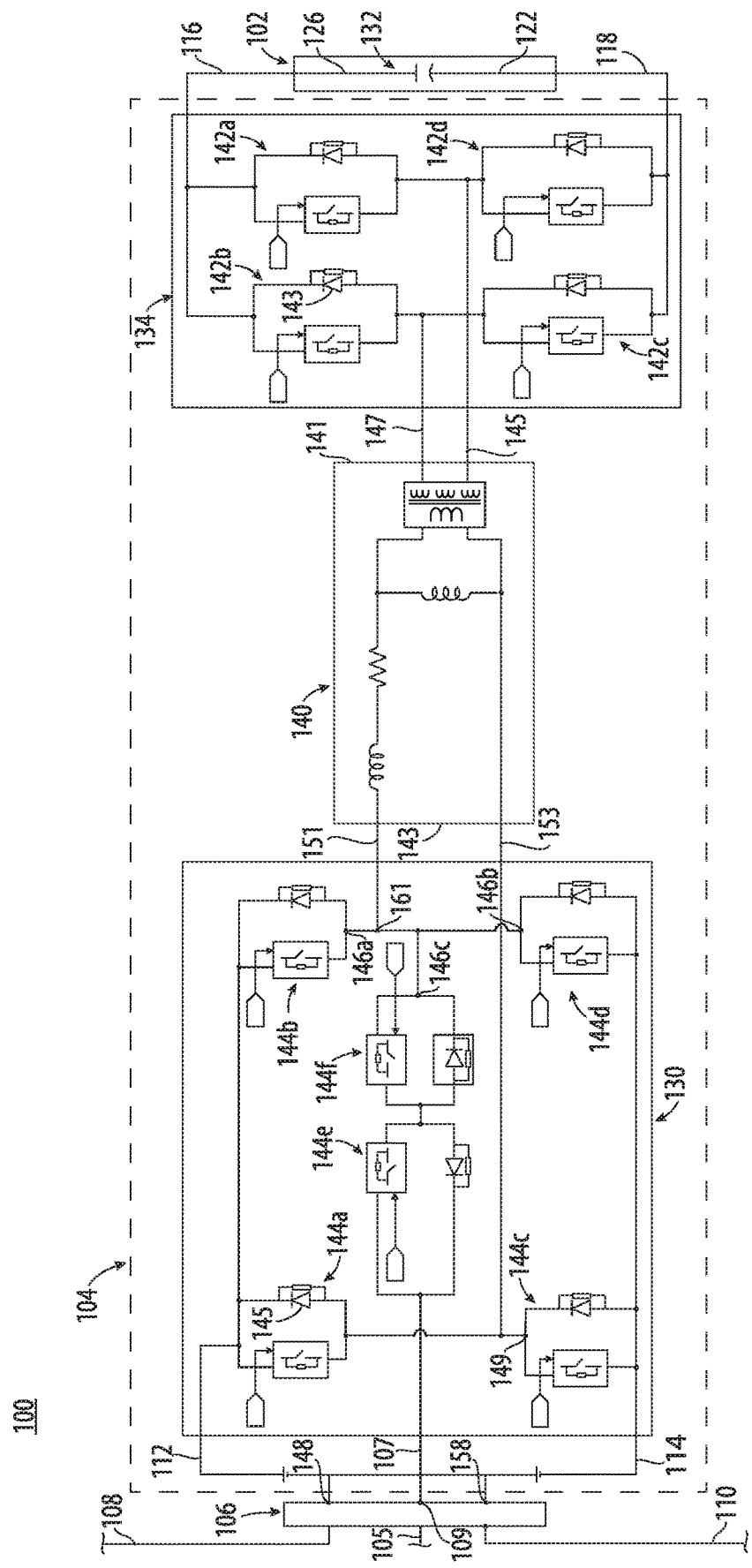
FIG. 3 is a detailed schematic view of the ESM of FIG. 1, showing the circuit elements of the ESM assembly.

As shown in FIGS. 2-3, ESM assembly 100 includes an energy storage module (ESM) 102, a multi-level dual active bridge (ML-DAB) 104, and a power filter 106. ESM assembly 100 is coupled to positive rail 22, neutral rail 24 and negative rail 26. Power filter 106 is connected between ML-DAB and DC bus 14. Multi-level refers to the different voltage levels in a system. In this case, the three levels are −270V (at positive negative converter conductor 114), 0V (at neutral conductor 107), and +270V (at positive output converter conductor 112). Those skilled in the art will readily appreciate that there can be more levels and those levels do not have to correspond to these values. However, for aircraft applications, 270V is typically the upper voltage limit due to corona (arcing that can occur at altitude due to low air density reducing dielectric resistance). Dual active refers to having both sides of the converter (high voltage side 130 and low voltage side 134) being actively controlled. In this case, both sides are active in order to achieve soft-switching (makes unit more efficient). With single active control, only one side would be actively controlled and the other side would passively rectify.

More particularly, a filter conductor of power filter 106 is connected to positive rail 22 by a positive filter lead 108 and another conductor of power filter 106 is connected to neutral rail 24 by a neutral filter lead 110. Filter lead 110 is coupled via a resistor 111 to neutral rail 24. Resistor 111 can be a high impedance resistor to ensure that power does not go neutral rail 24 and back into the generator 12. While resistor 111 is depicted on neutral filter lead 110 outside of power filter 106, those skilled in the art will readily appreciate that resistor 111 could be positioned on the lead 110 within power filter 106. Power filter 106 is connected to negative rail 26 by a negative filter lead 105. A converter conductor 112 of ML-DAB 104 is connected to a node (shown in FIG. 3 as node 148) of power filter 106, a neutral converter conductor 107 of ML-DAB is connected to a node 109 of power filter 106, and a converter conductor 114 of ML-DAB 104 is connected to a node (shown in FIG. 3 as node 158) of power filter 106.

With reference now to FIG. 3, ESM 102 includes an energy source 132. ML-DAB 104 is connected to energy source 132 to source current therefrom, or send current thereto, or both. ML-DAB 104 includes a bi-directional DC/AC converter 134. DC/AC converter 134 includes conductors 116 and 118 connected to ESM 102 and energy source 132. ML-DAB 104 includes a bi-directional isolation transformer 140. A low voltage side 141 of isolation transformer 140 is connected to bi-directional DC/AC converter 134 through conductors 145 and 147. ML-DAB 104 includes a second bi-directional DC/AC converter 130 connected to a high voltage side 143 of isolation transformer 140 through conductors 151 and 153. In some embodiments, energy source 132 can be a fuel cell, battery, and/or an ultracapacitor strung together in series or on their own.

As shown in FIGS. 2-3, conductor 116 of ML-DAB 104, e.g. a positive terminal conductor, is connected to positive ESM terminal 126. A singular negative ESM terminal (shown in FIG. 3 as negative ESM terminal 122) is connected to conductor 118, e.g. a negative terminal conductor 118. Energy source 132 is connected between negative ESM terminal 122 and positive ESM terminal 126. Those skilled in the art will readily appreciate that more than one energy source 132 can be used. Multiple energy sources 132 are connected in series with one another in a string between negative ESM terminal 122 and positive ESM terminal 126. In this respect, energy cells 132 can be mid-size ultracapacitors, e.g., capacitors having a capacitance in the range of 1 farad to about 500 farads. Notably, the ESM can be at either a lower or a higher voltage than power bus 14. ESM 102 can include, for example and without limitation, a battery or an ultracapacitor, or a hybrid of energy storage technologies With continued reference to FIGS. 2-3, the ML-DAB allows for a single ESM assembly 100 with a single larger battery to achieve a split bus output (as opposed to requiring two separate ESM architectures, e.g. one for positive and one for negative). Parallel stages of the single ESM assembly 100 can be used to achieve the desired power rating. As shown in FIG. 2, a second ESM assembly 100b, exact to ESM assembly 100, can be used in parallel with ESM assembly 100 in order to achieve higher power and/or energy storage requirements. This allows for a single design to be used to meet a wide range of applications. Those skilled in the art will readily appreciate that, in some embodiments, transformer 140 can have multiple inputs to provide parallel operation. In other words, transformer would have another set of connectors 145 and 147 to lead to a second DC/AC converter, e.g. similar to DC/AC converter 134, and another ESM, e.g. ESM 132. ESM architectures that require two separate ESM assemblies for split bus connection tend to occupy more space, have increased weight, and have complex interface systems, the embodiments of the present disclosure provide an ESM assembly with reduced weight, volume and complexity.

With continued reference to FIG. 3, each of first phase solid-state switch devices 142a-142d is provided with a diode 143 disposed in parallel with its respective corresponding switch 142a-142d. Solid-state switch devices 142a and 142b are coupled in series and solid-state switch devices 142c and 142d are coupled in series. Each of second phase solid-state switch devices 144a-144f is provided with a diode 145 disposed in parallel with the respective corresponding switch 144a-144f. Solid-state switch devices 144a and 144b are coupled in series, solid-state switch devices 144c and 144d are coupled in series, and solid state switch devices 144e and 144f are coupled in series. Second bi-directional DC/AC converter 130 is a t-type dual active bridge. T-type refers to the configuration of switches on the right side of 130 made up of switches 144b, 144e, 144f and 144d.

The second phase, e.g. second bi-directional DC/AC converter 130, includes three legs. A first leg connects between isolation transformer 140 and positive output converter conductor 112 at node 146a, and includes first and second solid-state switch devices 144a and 144b, connected in series with its endpoints. A second leg connects between isolation transformer 140 and negative converter conductor 114 at node 146b, and includes first and second solid-state switch devices 144c and 144d, connected in series with its endpoints. A third leg connects between isolation transformer 140 and neutral rail 24 at node 146c, and includes first and second solid-state switch devices 144e and 144f, connected in series with its endpoints. Isolation transformer 140 is connected by parallel couplings to nodes 161 and 149 to scale up/down voltage and provide galvanic isolation (protection).

With reference to FIGS. 2-3, a method of regulating voltage on a DC bus, e.g., DC bus 14, can be, for example, a proportional integral controller method with a feedforward term on the bus current. It is contemplated that there can be a deadzone on the output when it is near zero to keep the system from running all the time. The method includes comparing voltage on the DC bus to a DC bus voltage target. When a determination is made that the bus voltage is above the voltage target by a first predetermined amount, an absorb mode is entered in which a command is generated to control current to be absorbed by an ESM, such as ESM 102. Causing the current to be absorbed by the ESM can be performed, for example, based on a difference between the bus voltage and the target voltage. The absorbing of current can continue until the bus voltage returns within a predetermined range defined by the first predetermined amount and the voltage target or until the ESM becomes fully charged and is forced to stop charging.

When the bus voltage comparison indicates that the bus voltage is not above the voltage target by the first predetermined amount, a determination is made as to whether the bus voltage is below the target voltage by a second predetermined amount. If the comparison indicates that the bus voltage is not below the voltage target by the second predetermined amount, then bus voltage monitoring continues. When the comparison indicates that the bus voltage is below the voltage target by the second predetermined amount, a source mode is entered in which a command is generated to source current from the ESM, e.g., via the energy source 132. Sourcing the current from the ESM can be performed, for example, based on a difference between the bus voltage and the target voltage. The sourcing of the current can continue until the bus voltage returns to within a predetermined range defined by the first and second predetermined amounts.

The methods and systems of the present disclosure, as described above and shown in the drawings provide for ESM architectures with superior properties including lighter weight and reduced interface complexity. While the apparatus and methods of the subject disclosure have been shown and described with reference to certain embodiments, those skilled in the art will readily appreciate that change and/or modifications may be made thereto without departing from the scope of the subject disclosure.

What is claimed is:

1. An energy storage module (ESM) assembly, comprising:
an ESM having an energy source;
a multi-level dual active bridge (ML-DAB) connected to the energy source to source current therefrom, or send current thereto, or both, wherein the ML-DAB includes:
a bi-directional DC/AC converter, wherein the DC/AC converter includes a conductor connected to the energy source;
a bi-directional isolation transformer connected to the bi-directional DC/AC converter; and
a second bi-directional DC/AC converter connected to the isolation transformer, wherein the second bi-directional DC/AC converter is a t-type dual active bridge, and wherein the second bi-directional DC/AC converter includes a negative converter conductor, a neutral conductor, and a positive converter conductor; and
a power filter connected to the negative converter conductor, the neutral conductor, and the positive converter conductor of the ML-DAB, wherein the power filter includes a negative lead, a positive lead and neutral filter lead extending therefrom configured and adapted to be electrically coupled to a negative rail, a positive rail and a neutral rail, respectively, of a DC bus.

2. The ESM assembly as recited in claim 1, wherein the energy source includes at least one of a fuel cell, battery, or ultracapacitor.

3. A system architecture, comprising:
an ESM assembly as recited in claim 1; and
a DC bus connected to the ESM assembly.

4. The system architecture as recited in claim 3, wherein the power filter is coupled between the ML-DAB and the DC bus.

5. The system architecture as recited in claim 4, wherein the negative lead, the positive lead and the neutral filter lead extending from the power filter are electrically coupled to a negative rail, a positive rail and a neutral rail, respectively, of the DC bus.

6. The system architecture as recited in claim 3, wherein the ESM includes at least one of a fuel cell, battery, or ultracapacitor.

7. The system architecture as recited in claim 3, wherein the ESM assembly is a first ESM assembly, the system further comprising a second ESM assembly in parallel with the first ESM assembly.

8. The system architecture as recited in claim 7, wherein the second ESM assembly is electrically coupled to a negative rail, a positive rail and a neutral rail of the DC bus.

9. The ESM assembly as recited in claim 1, wherein the second bi-directional DC/AC converter includes three legs, wherein a first of the three legs connects between the bi-directional isolation transformer and the positive converter conductor and includes first and second solid-state switch devices connected in series, and wherein a second of the three legs connects between the isolation transformer and the negative converter conductor and includes first and second solid-state switch devices connected in series.

10. The ESM assembly as recited in claim 9, wherein a third of the three legs connects between the isolation transformer and the neutral conductor and includes only first and second solid-state switch devices connected in series.

11. The system architecture as recited in claim 3, wherein the second bi-directional DC/AC converter includes three legs, wherein a first of the three legs connects between the bi-directional isolation transformer and the positive converter conductor and includes first and second solid-state switch devices connected in series, wherein a second of the three legs connects between the isolation transformer and the negative converter conductor and includes first and second solid-state switch devices connected in series, wherein a third of the three legs connects between the isolation transformer and the neutral conductor and includes first and second solid-state switch devices connected in series.

12. The system architecture as recited in claim 11, wherein a third of the three legs connects between the isolation transformer and the neutral conductor and includes only first and second solid-state switch devices connected in series.

\* \* \* \* \*